Patented Feb. 14, 1939

2,147,395

UNITED STATES PATENT OFFICE 2,147,395

NONCORROSIVE ANTIFREEZE LIQUID

Alfred L. Bayes, Buffalo, N. Y., assignor to Carbide and Carbon Chemicals Corporation, a corporation of New York No Drawing. Application June 12, 1937,
Serial No. 147,865

13 Claims. (Cl. 252—5)

The invention relates to new liquid compositions which have non-corrosive and anti-freeze properties, and which are especially adapted for use in the fluid cooling systems of internal combustion engines. It is particularly concerned with improved inhibitor compositions for preventing corrosion of the metals of an automobile cooling system in which an alcohol is employed as an anti-freeze medium.

Alcohols of various kinds are now quite generally used as freezing point depressants in cooling fluids. These include the monohydroxy alcohols, such as methanol, ethanol and propanol, and the polyhydroxy alcohols, of which ethylene glycol, propylene glycol, diethylene glycol, mixtures of the glycols, and glycerol are representative. The compositions of this invention may include any of these liquids as the anti-freeze medium, and in the following disclosure and claims reference to an alcohol is intended to include any of the saturated aliphatic hydroxy compounds, or mixtures thereof.

Pure alcohols are not considered to be inherently corrosive to metals, but under conditions of their use in anti-freeze liquids numerous factors are encountered through which a corrosive action may be induced in the cooling fluid. The fluid in circulation, usually after dilution to varying degrees with water, is constantly subjected to agitation in the presence of air. This aeration, coupled often with general or localized overheating, leakage of exhaust gas and other foreign materials into the system, and numerous other factors are conducive to reactions which may effect metal corrosion. It has, therefore, become customary to add inhibitors to alcohol anti-freeze compositions for the purpose of preventing or counteracting induced corrosive conditions. Numerous corrosion inhibitors have been proposed in the art, but many of them are only partially effective, or subject to many other disadvantages in extensive use. More generally satisfactory inhibitor compositions are, therefore, desirable and of value in this art.

It is an object of this invention to provide improved corrosion inhibitor compositions for alcohol anti-freeze liquids which will effectively protect all metals of a cooling system, and maintain substantially non-corrosive conditions in a cooling fluid employing an alcohol either in full strength or in dilution with water.

I have found that a mixture of a soluble nitrite, particularly an alkali metal nitrite, and a soluble salt of tungstic, selenic, or molybdic acids will afford excellent protection for all metals of a cooling system, including iron, copper, brass, solder, and aluminum, when added in minor quantities to any of the alcohols commonly used in anti-freeze liquids. Such a mixture will further provide resistance to corrosion over extended periods of use of the cooling fluid and under all normal operating conditions.

Nitrite salts, in particular sodium and potassium nitrites, have heretofore been used in corrosion protection, and their function in this capacity is well recognized. The inhibiting action, however, of these salts is limited only to certain metals, and in an automobile cooling system they will afford little or no protection for solder, a metal commonly used in such systems in a manner exposing it to contact with the cooling fluid. Soluble tungstates, selenates and molybdates are applicable in their protective action to all metals of the cooling system, and in mixture with a nitrite supplement the inhibitive action of the latter. It is a further fact that the composite inhibitor shows results beyond those which might be expected purely from the additive action of each constituent, and affords protection for all of the cooling system metals at an acidity in the cooling fluid which would completely destroy the inhibiting action of the individual compounds. For example, a tungstate-nitrite mixture will give good protection in a liquid having a pH value below 5.0, whereas neither of the separate components will function below a pH value of 6.0.

Alkali metal nitrites are preferred as one constituent of the inhibitor mixture, and sodium nitrite in mixture with sodium tungstate, sodium selenate, sodium molybdate, or corresponding ammonium salts has given especially good results. Only very small quantities of each component are necessary within a range, for example, of from 0.05 to 1.0% by weight of the alcohol, the most suitable concentration varying somewhat with the particular alcohol chosen as the anti-freeze medium, and the degree of dilution expected in use of the cooling fluid.

While the above compounds, without further additions, will give very satisfactory and complete corrosion protection, further admixture can be made, if desired, with other inhibitors which have been heretofore known. This might include an alkaline substance, such as triethanolamine or sodium hydroxide, for the purpose of imparting reserve alkalinity to the cooling fluid which may prolong the life of the essential inhibitor should severe acid conditions develop. Minor quantities of a soluble or emulsifiable oil might also be added, particularly in the capacity of a leakage retardant. Anti-leak agents of a gum nature, dyestuffs for coloring, a soluble phosphate or nitrate specifically for additional aluminum protection, and other additive materials can be used without destroying the protective function of the essential inhibitor mixture.

A specific anti-freeze composition representative of the invention is one employing ethylene glycol as the freezing point depressant to which there is added, in percent by weight of the full strength glycol, 0.5% sodium nitrite, 0.2% sodium tungstate and 1.5% of an oil mixture consisting of about 10 parts of sulfonated neat's-foot oil and about 90 parts of mineral oil. Other formulae which have given especially good results, and include further addition agents, are as follows:

|  | 1 | 2 |
| --- | --- | --- |
|  | Percent | Percent |
| Sodium nitrite | 0.5 | 0.3 |
| Sodium tungstate | 0.2 | 0.15 |
| Oil (10 sulfonated neat's-foot: 90 mineral) | 1.5 | --- |
| Sodium nitrate | 0.05 | 0.05 |
| Gum karaya | 0.05 | 0.05 |
| Ethylene glycol balance to | 100 | 100 |

It will be understood that modifications in the specific formulae given can be made to suit any particular cooling fluid. The essential inhibitor mixture is applicable in use with any of the common anti-freeze alcohols, and it has shown especially good results with ethylene glycol and glycol mixtures. Any desired dilution with water can be made without affecting the corrosion protection afforded, which is maintained during the normal life and operating conditions of the cooling fluid.

The invention should not be limited other than as defined in the appended claims.

I claim:

1. A non-corrosive anti-freeze liquid comprising an alcohol and an inhibitor essentially composed of a mixture of a soluble nitrite salt and a soluble salt of an acid of the group consisting of tungstic, selenic and molybdic acids.

2. A non-corrosive anti-freeze liquid comprising an alcohol and an inhibitor essentially composed of a mixture of an alkali metal nitrite and a soluble salt of an acid of the group consisting of tungstic, selenic and molybdic acids.

3. A non-corrosive anti-freeze liquid comprising an alcohol and an inhibitor essentially composed of a mixture of an alkali metal nitrite and a soluble salt of an acid of the group consisting of tungstic, selenic and molybdic acids, both of said components being present in an amount of about 0.05% to about 1.0% by weight of the alcohol.

4. A non-corrosive anti-freeze liquid comprising ethylene glycol and an inhibitor essentially composed of a mixture of about 0.05% to about 1.0% of sodium nitrite and about 0.05% to about 1.0% of sodium tungstate.

5. A non-corrosive anti-freeze liquid comprising ethylene glycol and an inhibitor essentially composed of a mixture of about 0.05% to about 1.0% of sodium nitrite and about 0.05% to about 1.0% of sodium selenate.

6. A non-corrosive anti-freeze liquid comprising ethylene glycol and an inhibitor essentially composed of a mixture of about 0.05% to about 1.0% of sodium nitrite and about 0.05% to about 1.0% of sodium molybdate.

7. In a non-corrosive anti-freeze liquid containing an alcohol and an oil inhibitor, an essential inhibitor of metal corrosion composed of a mixture of a soluble nitrite salt and a soluble salt of an acid of the group consisting of tungstic, selenic and molybdic acids.

8. In a non-corrosive anti-freeze liquid containing an alcohol and inhibitors of an emulsifiable oil, a soluble nitrate and a gum, an essential inhibitor of metal corrosion composed of a mixture of a soluble nitrite salt and a soluble salt of an acid of the group consisting of tungstic, selenic and molybdic acids.

9. Method of inhibiting corrosion of metals by an alcohol solution in contact therewith, which comprises contacting said solution with metals in the presence of an inhibitor essentially composed of a mixture of a soluble alkali metal nitrite and a soluble salt of an acid of the group consisting of tungstic, selenic and molybdic acids.

10. Method of inhibiting corrosion of metals by an alcohol solution in contact therewith, which comprises contacting said solution with metals in the presence of an inhibitor essentially composed of a mixture of sodium nitrite and sodium tungstate, both of said components being present in an amount of about 0.05% to about 1.0% by weight of the alcohol.

11. A non-corrosive anti-freeze liquid comprising an alcohol and an inhibitor essentially composed of a mixture of about 0.05% to about 1.0% of sodium nitrite and about 0.05% to about 1.0% of sodium tungstate.

12. A non-corrosive anti-freeze liquid comprising an alcohol and an inhibitor essentially composed of a mixture of about 0.05% to about 1.0% of sodium nitrite and about 0.05% to about 1.0% of sodium selenate.

13. A non-corrosive anti-freeze liquid comprising an alcohol and an inhibitor essentially composed of a mixture of about 0.05% to about 1.0% of sodium nitrite and about 0.05% to about 1.0% of sodium molybdate.

ALFRED L. BAYES.